Aug. 29, 1950  A. W. MÜLLER  2,520,773
ORTHODONTIC DEVICE
Filed July 14, 1949  2 Sheets-Sheet 1
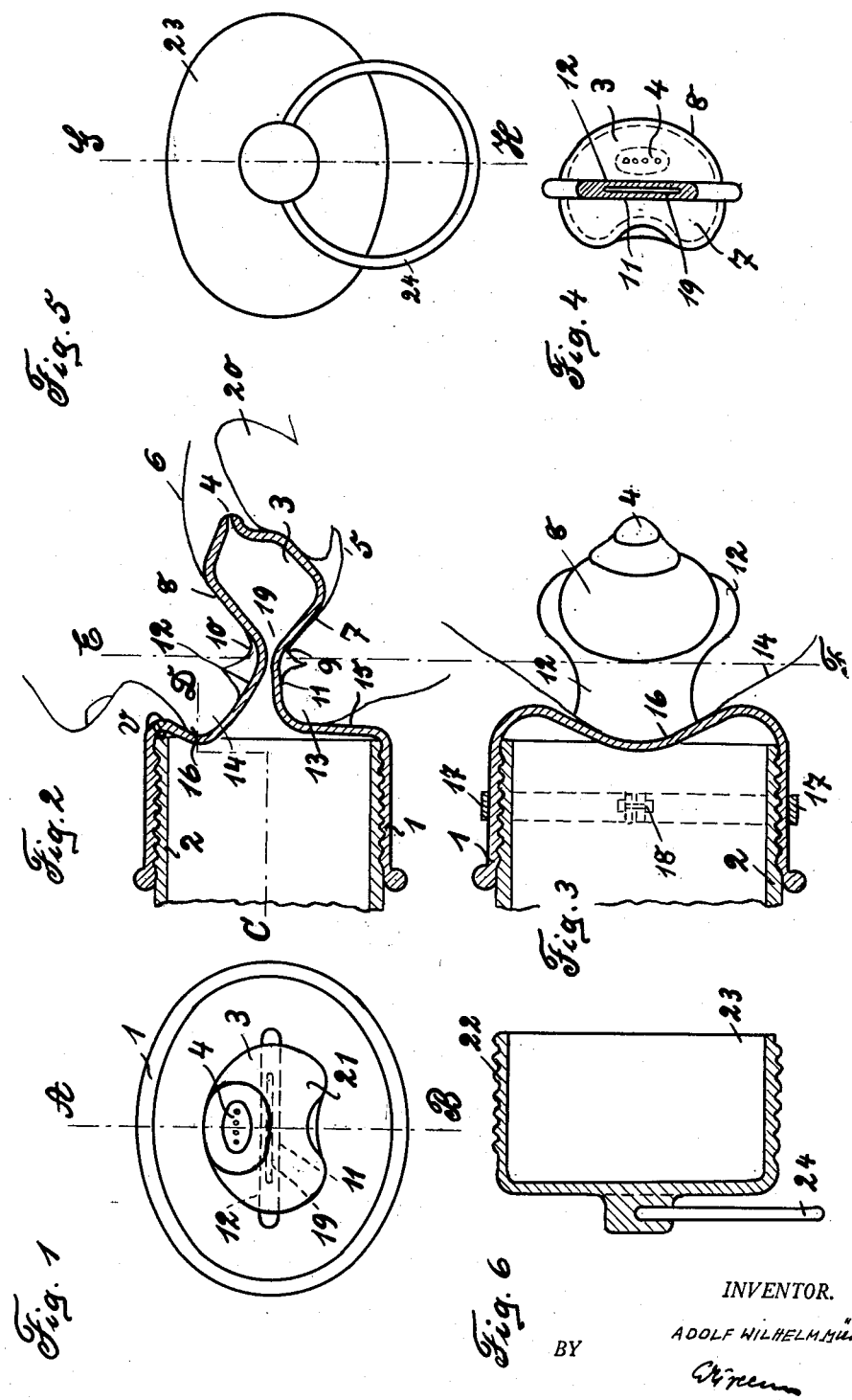
INVENTOR.
ADOLF WILHELM MÜLLER
BY
ATTORNEY Aug. 29, 1950     A. W. MÜLLER     2,520,773
ORTHODONTIC DEVICE
Filed July 14, 1949                      2 Sheets-Sheet 2
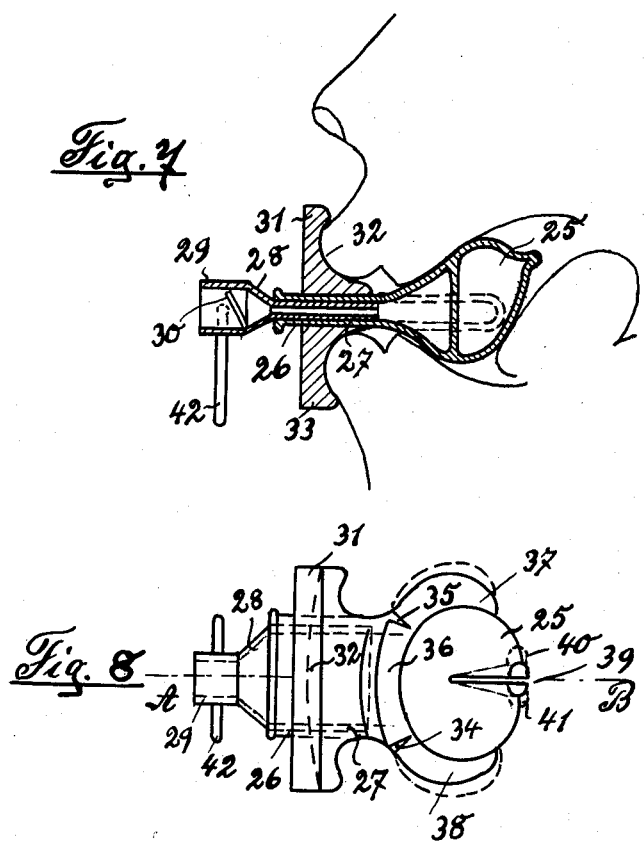
INVENTOR.
ADOLF WILHELM MÜLLER
BY
ATTORNEY Patented Aug. 29, 1950

2,520,773

UNITED STATES PATENT OFFICE 2,520,773

ORTHODONTIC DEVICE

Adolf Wilhelm Müller, Sulzbach, Germany

Application July 14, 1949, Serial No. 104,715
In France August 13, 1948

12 Claims. (Cl. 128—252)

The invention relates to an orthodontic appliance particularly for use in connection with the mouth organs of infants.

The devices hitherto used for this purpose are not efficient because they do not sufficiently consider the typical sucking instinct of the infant.

The customary milk nipples, which are readily accepted by infants as an appliance to satisfy their sucking desire have an injurious influence on the morphologic formation of the jaw and cause articulation disturbances resulting in a vertical deflection of the bite. Moreover, occlusion disturbances including considerable sagittal anomalies such as prognatism and distal bite may result from the excessive use of the customary finger-shaped milk nipples. Still more dangerous is the intensive inclination of the infant to suck on its fingers.

It is the primary object of this invention to utilize the typical sucking impetus of the infant for an orthodontic treatment and for the manipulation of the mouth organs, particularly the jaws and lips and for the exclusion of the disadvantages arising from the sucking on the fingers.

It is also an object of the invention to vary the applicability of this treatment and to use it in conformity with its special characteristics for the orthodontic treatment of both the jaws and the lips of infants or either of them.

The customary milk nipples do not provide the slightest guarantee that they are properly located within and held in the mouth and particularly by the jaws and the lips of the infant; moreover, they produce, as mentioned before, an injurious articulation of the jaws and lips and do not further their satisfactory growth. The main reason for this deficiency is that the milk flows continuously and uniformly from the bottle and the infant is not forced to use the organs of its mouth in order to force the outflow of milk. The operation of these nipples is therefore, very different from the natural nursing art which is based on a two-step action, namely sucking and biting.

It is therefore a further object of this invention to eliminate the hitherto customary continuous milk supply through nipples and to replace the same by a two-step milk feeding procedure in conformity with the above-given explanation.

With these and additional objects in view which will become apparent, as this description proceeds the invention comprises in its broad aspect an orthodontic device to be introduced into the mouth of an infant having the shape of a small bag which is provided at its inner or mouth entering end with a milk supplying nozzle or orifice and at the opposite end with a converging wall, which borders the jaws; this wall extends into a short flat bite portion encasing a flat passage which portion borders the jaw ridges and this bite portion transits into a circular expanding lip bordering member.

The device may be provided with a tubular attachment for connection with the neck of a milk bottle.

A continuous milk supply by sucking is excluded by the use of this device; upon an attempt by the infant in this direction the lips and the jaws produce a pressure acting on the short bite portion enclosing the flat milk supply passage which therefore would be closed immediately. Only by an intermittent biting and sucking step can the milk be transported from the bottle into the baglet and from there into the mouth of the infant. It is the swallowing action of the infant accompanied by a dropping of the lower jaw and a withdrawal of the tongue which makes the milk flow into the bag through the above-mentioned flat passage; due to the very small cross section of the outlet nozzle a vacuum results in the mouth into which the bag expands during the forced biting action. In this manner, the natural nursing procedure is reconstructed and the basis created for satisfactory orthodontic influence on the jaws.

In order to further increase the operational analogy of this device with the natural nursing art a rubber sponge conforming to the shape of the baglet may be inserted into the latter. This insert assists in assimilating the action of the instant device to that of a woman's breast nipple.

It has been found advisable to stiffen the lower jaw bordering converging portion of the device in order to prevent the bag from being compressed during the biting action of the infant as hereby the injurious distal bite may result.

To prevent the return flow of the milk into the bottle in those cases where the infant does not exert a sufficient biting force a valve may be located at the milk inflow portion in the bag. The device also furthers nose breathing and accordingly assists in the development of the breathing organs, nose and throat by the introduction of preheated air into the lungs; it avoids the swallowing of air and may, therefore, during the night, also be useful for older children.

The invention is by way of example illustrated in the accompanying drawings:

In the drawings:

Fig. 1 is a front view of the orthodontic device forming the subject matter of this invention, Fig. 2 is a vertical sectional view on line A—B of Fig. 1 the device bordering elements of the mouth of the infant being schematically shown, Fig. 3 is partly a top plan and partly a vertical section on line C—D of Fig. 2, Fig. 4 is a vertical sectional view on line E—F of Fig. 3, Fig. 5 illustrates the application of the instant device to a tubular article, Fig. 6 is a vertical sectional view on line G—H of Fig. 5, Fig. 7 is a vertical sectional view similar to that of Fig. 2 of a further embodiment of my device and Fig. 8 is a top plan view of the article shown in Fig. 7.

The orthodontic device shown in Figs. 1-5 of the drawings has a tubular attachment sleeve 1 which is inwardly ribbed and adapted to be applied to the outwardly ribbed neck 2 of a milk bottle. The device consists mainly of a baglet 3; at the left end, which is the inner or mouth inserting end of this baglet a nozzle 4 is provided, Figs. 1, 2, 3, which has such a small cross sectional area that the milk will not voluntarily or without pressure flow from the bag 3. The bag converges at the opposite end into a wall composed of the lower portion 7 and the upper portion 8, which in the operative position of the device borders the lower jaw 5 and the upper jaw 6 of the infant. The wall 7, 8 transits into a short horizontal flat portion 11, 12 onto which the infant bites; this portion encloses an inner flat passage 19, Fig. 4. The bite portion 11, 12 expands into an outflaring body 15, 16 which is bordered by the lips 13, 14 of the infant; this outflaring conical body carries at its end the tubular attaching sleeve 1.

The device may be attached with the sleeve 1 onto the upper end 2 of a milk bottle. It is then placed with the nozzle end into the mouth of the infant and will border with its portions 7, 8 the jaws 5, 6; this portion 7, 8 will, therefore, extend within the reach of the palatum durum and the lingual mandibula up to the jaw ridges 9, 10, see Fig. 2. The normal articulation is secured by the bite portion 11, 12 which reaches up to the milk molars; proper coöperation of the lips 13, 14 is secured by the outflaring portion 15, 16 and its positional relationship to the portions 7, 8 and 11, 12.

By a change of the position of the attachment tube 1 on the neck 2 of the bottle the distance between portion 7, 8 and the front part of the lip bordering portion 15, 16 may be varied.

In this manner a mode of adaptation is established to sagittal differences. The proper distance may be obtained by the attachment of a band 17 to the bottle neck to be fixed by a screw 18 in its proper position.

In the position of the device shown in Fig. 2 a biting and sucking action by the infant is secured because in order to suck the milk from the baglet 3 the jaw ridges 9, 10 and the lips 13, 14 are pressed onto the bite portion 11, 12, whereby the passage 19 is compressed. The biting step is necessitated by the very small cross section of the nozzle 4; the baby must bite in order to force the milk to flow through this nozzle. During the biting and sucking steps the lower jaw is retracted and the tongue 20 advanced; hereby the lower jaw 5 bordering portion 7 and the tongue 20 bordering portion 21 are removed relative to each other, the space between the two is reduced and the milk forced from the baglet 3. During the subsequent swallowing a vacuum will be produced in the mouth, since by the simultaneous opening of the jaw bordering portions the passage 19 is opened and the milk will enter the baglet 3. The here described two-step drinking process corresponds to the natural nursing act.

An air inlet valve V, Fig. 2, is applied to the device. The latter, may, as such be used as a nipple for which purpose it is pulled with its tubular extension 1 over a grooved hollow body 23, made for instance, from plastics, and fixed on the same by the band 17. A ring 24 is provided to separate the hollow body 23 from the device. The bag 3 can be easily cleaned first at the outside and then by turning the same inside out at the inside.

A better adjustment of the sagittal distance of my combined orthodontic and nipple device may be effected by making the lip bordering portion 15, 16, a separate body, which may be slid over a sagittal extension of part of the biting portion 11, 12; this body is fixed at a desired distance from bag 3; the sucking-out of the contents of the milk bottle is prevented by the compression of the bite portion 11, 12.

A further modification of my invention is illustrated in Figs. 7, 8; it has the advantage of exact adjustment and adaptability to the shape of the jaws.

The baglet 25 is provided with a tubular extension 26 which reaches over the air intake tube 28 the latter being provided with a mouthpiece 29 and valve 30. The tube 26 is hereby extended and operatively connected with slide 31 which represents the bordering portions 32 for the upper lip and 33 for the lower lip. The bite portion is divided into two lateral sections 37, 38 and a frontal section 36 by the wedge-shaped recesses 34, 35. The nozzle 25 is divided by a slotted recess 39 in two halves 40, 41. The wall thickness of the baglet is reduced towards the slot 39, whereupon contact may be made between the baglet walls if the same is puffed-up. Also the wall in the vicinity of the bit portion 37, 38 is thinned-down so that those parts may laterally expand; this is from an orthodontic viewpoint important as hereby an exactly controllable lateral extension may be exerted on the jaws whereby the jaws or their ridges will retain their usual biting area, as the latter may follow the lateral expansion without an increase of their thickness.

The air inlet tube 27, 28 is provided with a ring 42, which may be turned down in order to blow up the bag 3. If the bag is blown-up too much a flap 30 is provided for the escape of surplus air.

The ring 42 may also be applied to the slide whereby the tearing-apart will be avoided of the parts due to the pull exerted on the ring.

The nozzle 40, 41 may be provided with an air inlet valve. If the device is to be used as a milk nipple the slide 31 will be extended into a thread bearing body for attachment to the milk bottle.

The invention has been described with reference to a preferred embodiment and it will be understood that many variations and modifications thereof may be resorted to without departure from the scope of the invention as defined in the following claims.

What I claim is:

1. An orthodontic appliance to be inserted into the mouth of an infant comprising a bag-shaped body of an elastic material, a nozzle at the mouth entering side of said bag and a converging wall at the opposite side forming a jaw bordering portion, a flat bridging piece attached with its one end to said converging wall enclosing a flat passage and forming a biting face and a conical extension attached to the free end of said bridging piece said extension forming a lip bordering portion.

2. A combined orthodontic and milk supplying appliance for insertion into the mouth of an infant comprising a bag shaped body of an elastic material, an outlet nozzle at the mouth entering side of said bag, a converging wall at the opposite side, a flat portion attached to said converging wall enclosing a milk supply passage, means to connect said flat portion with a milk supply, the cross sectional area of the outlet nozzle being restricted in comparison to the cross section of said supply passage whereby a pumping and lifting action of the jaws is initiated in order to maintain the milk supply.

3. An orthodontic device to be inserted into the mouth of an infant comprising a bag-shaped body of an elastic material, a nozzle at the mouth entering side of said bag and a converging wall at the opposite end forming a jaw bordering portion, a flat bridging piece attached to said converging wall enclosing a flat passage and forming a biting face, a conical extension attached to the free end of said bridging piece said extension forming a lip bordering portion and a rubber sponge shaped in conformity with the inner bag contour removably placed into the bag.

4. An orthodontic device to be inserted into the mouth of an infant comprising a bag-shaped body of an elastic material, a nozzle at the mouth entering side of said bag and a converging wall at the opposite end forming an upper and lower jaw bordering portion, a flat bridging piece attached to said converging wall enclosing a flat passage and forming a biting face, a conical extension attached to the free end of said bridging piece said extension forming a lip bordering portion, the lower jaw bordering portion having a greater wall thickness than the rest of the bag wall.

5. An orthodontic device to be inserted into the mouth of an infant comprising a bag-shaped body of an elastic material, a nozzle at the mouth entering side of said bag and a converging wall at the opposite end forming a jaw bordering portion, a flat bridging piece attached to said converging wall enclosing a flat passage and forming a biting face and a conical extension attached to the free end of said bridging piece said extension forming a lip bordering portion and a valve located directly in front of the inlet point of said passage into said bag.

6. An orthodontic device to be inserted into the mouth of an infant comprising a bag-shaped body of an elastic material, a nozzle at the mouth entering side of said bag and a converging wall at the opposite end forming a jaw bordering portion, a flat bridging piece attached to said converging wall enclosing a flat passage and forming a biting face, a conical extension attached to the free end of said bridging piece said extension forming a lip bordering portion to be stripped over a bottle neck and means to fix said extension on said bottle neck.

7. An orthodontic device comprising a bag-shaped body of an elastic material, a nozzle at the mouth entering side of said bag and a converging wall at the opposite end forming a jaw bordering portion, a flat bridging piece attached to said converging wall enclosing a flat passage and forming a biting face, a conical extension attached to the free end of said bridging piece said extension forming a lip bordering portion, the lip bordering portion being a separate body provided with a tubular extension and means to fixedly position said body at a desired distance from said bag.

8. An orthodontic device to be inserted into the mouth of an infant comprising a bag-shaped body of an elastic material, a nozzle at the mouth entering side of said bag and a converging wall at the opposite end forming a jaw bordering portion, a flat bridging piece attached to said converging wall enclosing a flat passage and forming a biting face and a conical extension attached to the free end of said bridging piece said extension forming a lip bordering portion said portion consisting of two lateral and a frontal section.

9. An orthodontic device to be inserted into the mouth of an infant comprising a bag-shaped body of an elastic material, a nozzle at the mouth entering side of said bag and a converging wall at the opposite end forming a jaw bordering portion, a flat bridging piece attached to said converging wall enclosing a flat passage and forming a biting face, a conical extension attached to the free end of said bridging piece said extension forming a lip bordering portion, a flat tubular extension being attached to said bag at the mouth protruding end, a circular slide provided with a lip bordering portion located on said extension, a tube in said tubular extension and a cylindrical open-ended mouthpiece at the outer end of said extension.

10. An orthodontic device to be inserted into the mouth of an infant comprising a bag-shaped body of an elastic material, a nozzle at the mouth entering side of said bag and a converging wall at the opposite end forming a jaw bordering portion, a flat bridging piece attached to said converging wall enclosing a flat passage and forming a biting face and a conical extension attached to the free end of said bridging piece said extension forming a lip bordering portion the thickness of the bag walls being controlled in such a manner that a dilation of the bag is only enabled in the lateral direction.

11. An orthodontic device to be inserted into the mouth of an infant comprising a bag-shaped body of an elastic material, a nozzle at the mouth entering side of said bag and a converging wall at the opposite end forming a jaw bordering portion, a flat bridging piece attached to said converging wall enclosing a flat passage and forming a biting face, a conical extension attached to the free end of said bridging piece said extension forming lip bordering portion and a central inner partition in said bag.

12. An orthodontic device to be inserted into the mouth of an infant comprising a bag-shaped body of an elastic material, a nozzle at the mouth entering side of said bag and a converging wall at the opposite end forming a jaw bordering portion, a flat bridging piece attached to said converging wall enclosing a flat passage and forming a biting face, a conical extension attached to the free end of said bridging portion said extension forming a lip bordering portion, the last portion consisting of two lateral and a frontal section and being provided with wedge-shaped incisions at approximately those places where the frontal and the lateral sections meet.

ADOLF WILHELM MÜLLER.

No references cited.